C. T. GILMORE.
SHIRT IRONING MACHINE.
APPLICATION FILED NOV. 15, 1909.

985,026.

Patented Feb. 21, 1911.

6 SHEETS—SHEET 1.

Witnesses:
John Enders
Chas. H. Buell

Inventor:
Charles T. Gilmore.
By Dyrenforth, Lee, Chritton & Wiles
Attys.

C. T. GILMORE.
SHIRT IRONING MACHINE.
APPLICATION FILED NOV. 15, 1909.

985,026.

Patented Feb. 21, 1911.
6 SHEETS—SHEET 3.

Witnesses:
John Enders
Chas. H. Buell.

Inventor:
Charles T. Gilmore.
By Dyrenforth, Lee, Chritton & Wiles
Attys.

C. T. GILMORE.
SHIRT IRONING MACHINE.
APPLICATION FILED NOV. 15, 1909.

985,026.

Patented Feb. 21, 1911.

6 SHEETS—SHEET 5.

Witnesses:
John Enders
Chas. H Bull

Inventor:
Charles T. Gilmore.
By Dyrenforth, Lee, Chritton & Wiles
Attys.

C. T. GILMORE.
SHIRT IRONING MACHINE.
APPLICATION FILED NOV. 15, 1909.
985,026.
Patented Feb. 21, 1911.
6 SHEETS—SHEET 6.
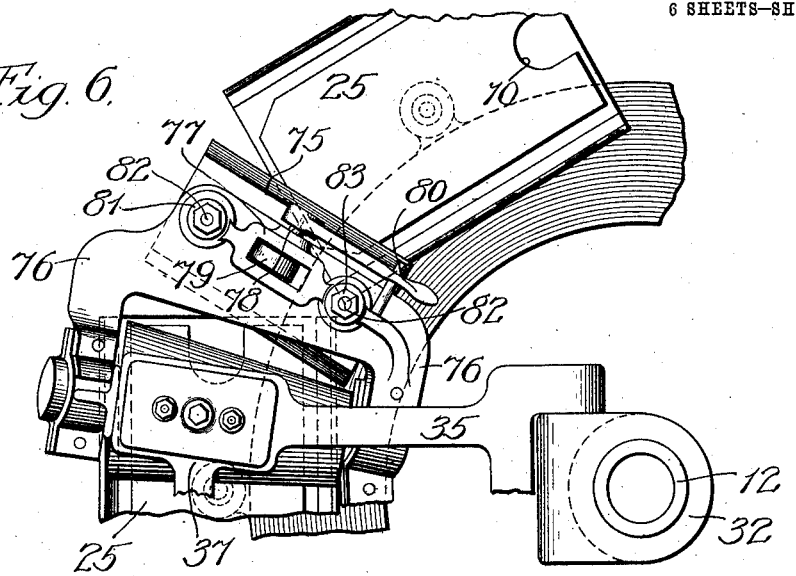
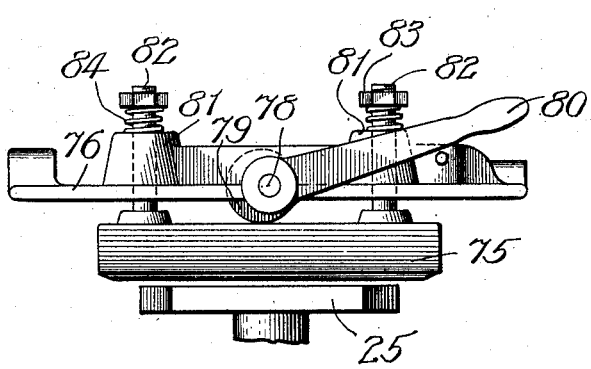
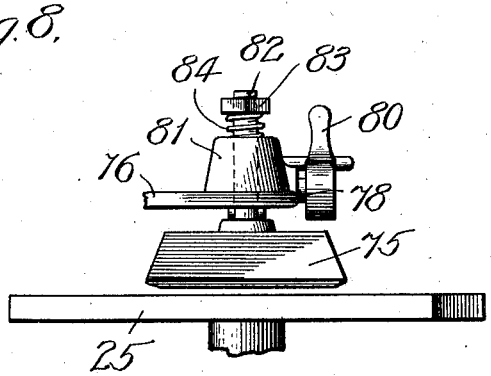
Witnesses:
John Enders
Chas. H. Buell
Inventor.
Charles T. Gilmore.
By Dyrenforth, Lee, Chritton & Wiles
Attys.

UNITED STATES PATENT OFFICE.

CHARLES T. GILMORE, OF CHICAGO, ILLINOIS.

SHIRT-IRONING MACHINE.

985,026.  Specification of Letters Patent.  Patented Feb. 21, 1911.

Application filed November 15, 1909. Serial No. 528,044.

*To all whom it may concern:*

Be it known that I, CHARLES T. GILMORE, a citizen of the United States, residing at Chicago, in the county of Cook and State of Illinois, have invented a new and useful Improvement in Shirt-Ironing Machines, of which the following is a specification.

My object is to provide improvements in shirt-ironing machines to the end of rendering the machine more compact and permitting a larger number of operators to work at the machine, as compared with machines as hitherto constructed, in applying shirts thereto to be ironed and removing them in ironed condition, thus expediting the ironing operation and permitting the operation of the machine to be continuous.

Figure 1:
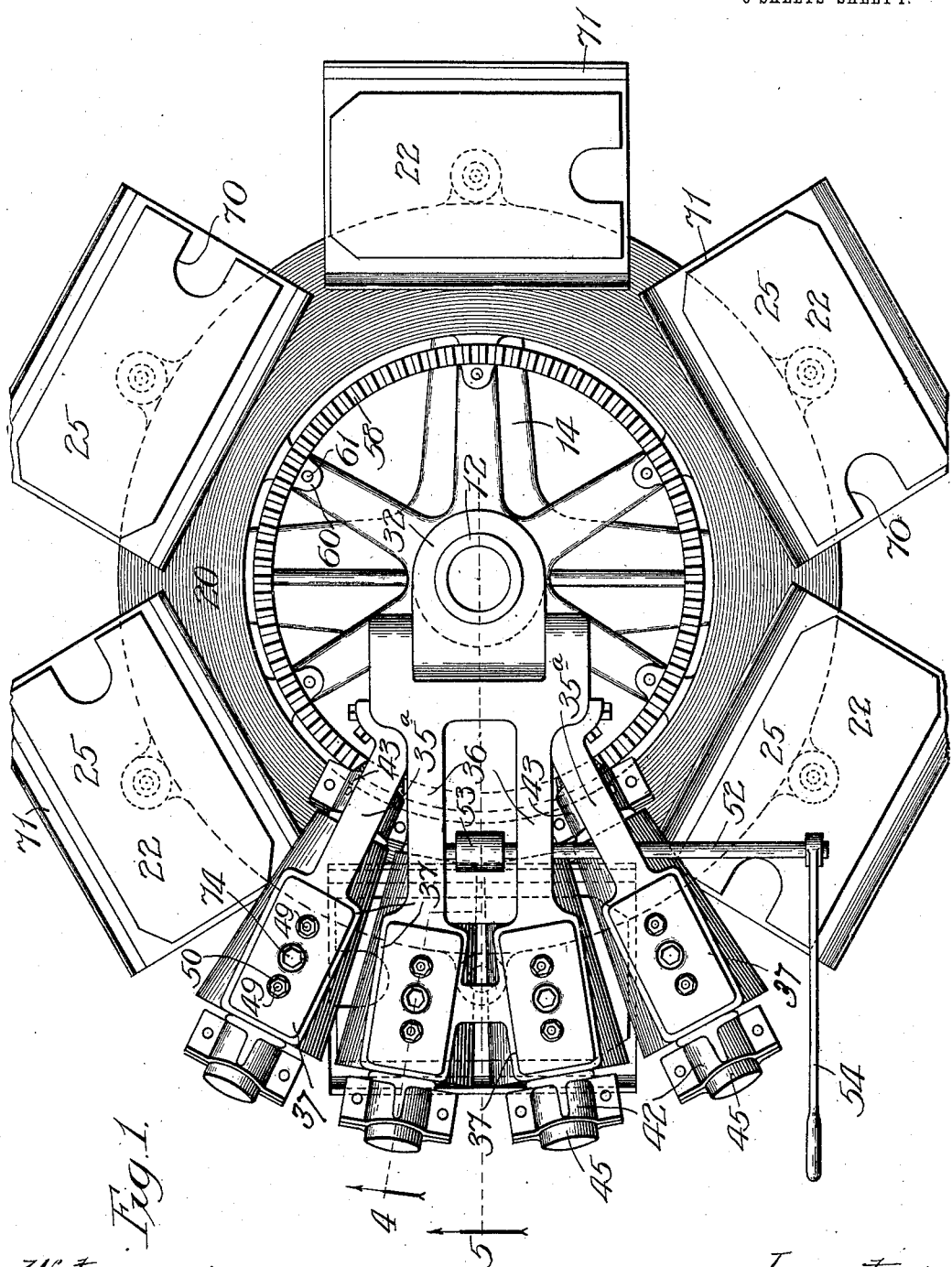
Figure 2:
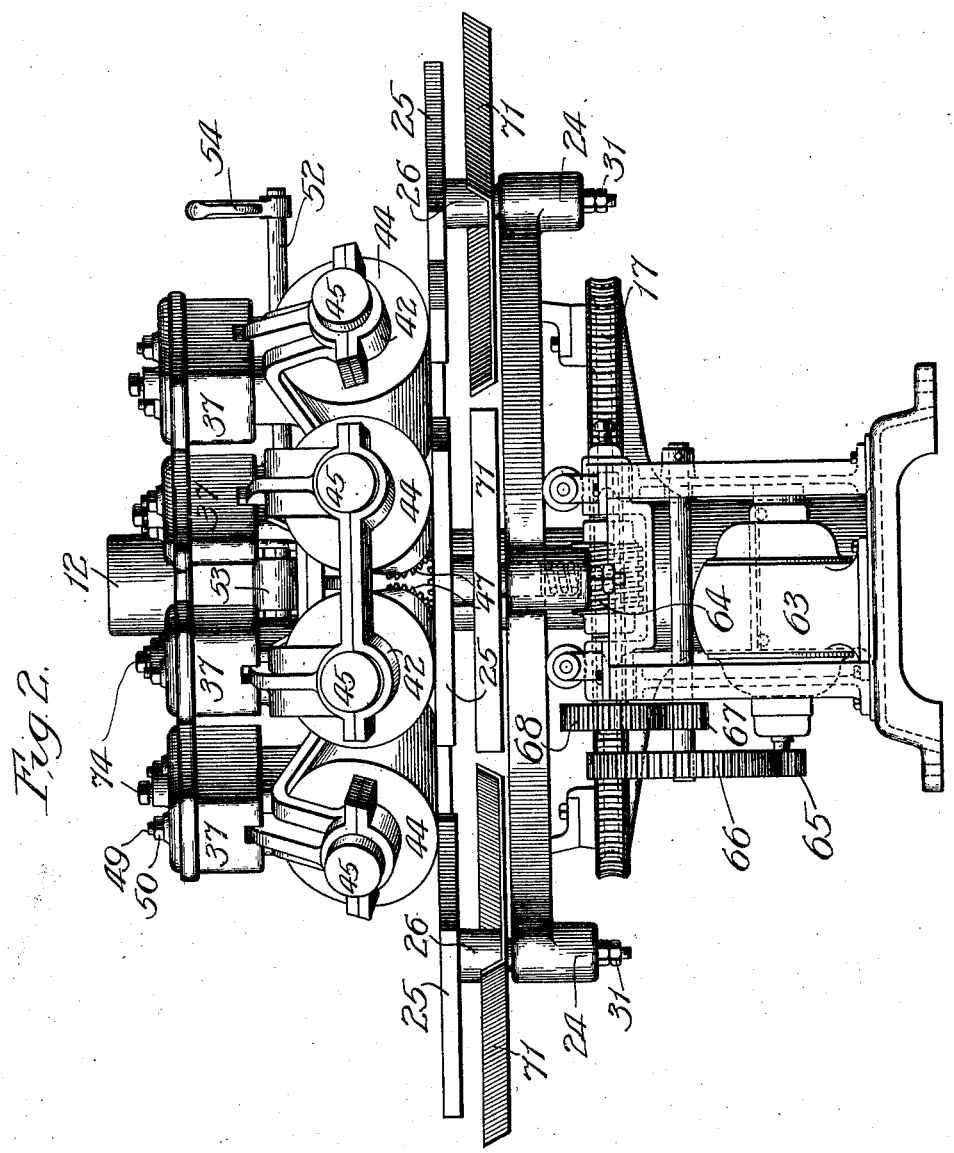
Figure 3:
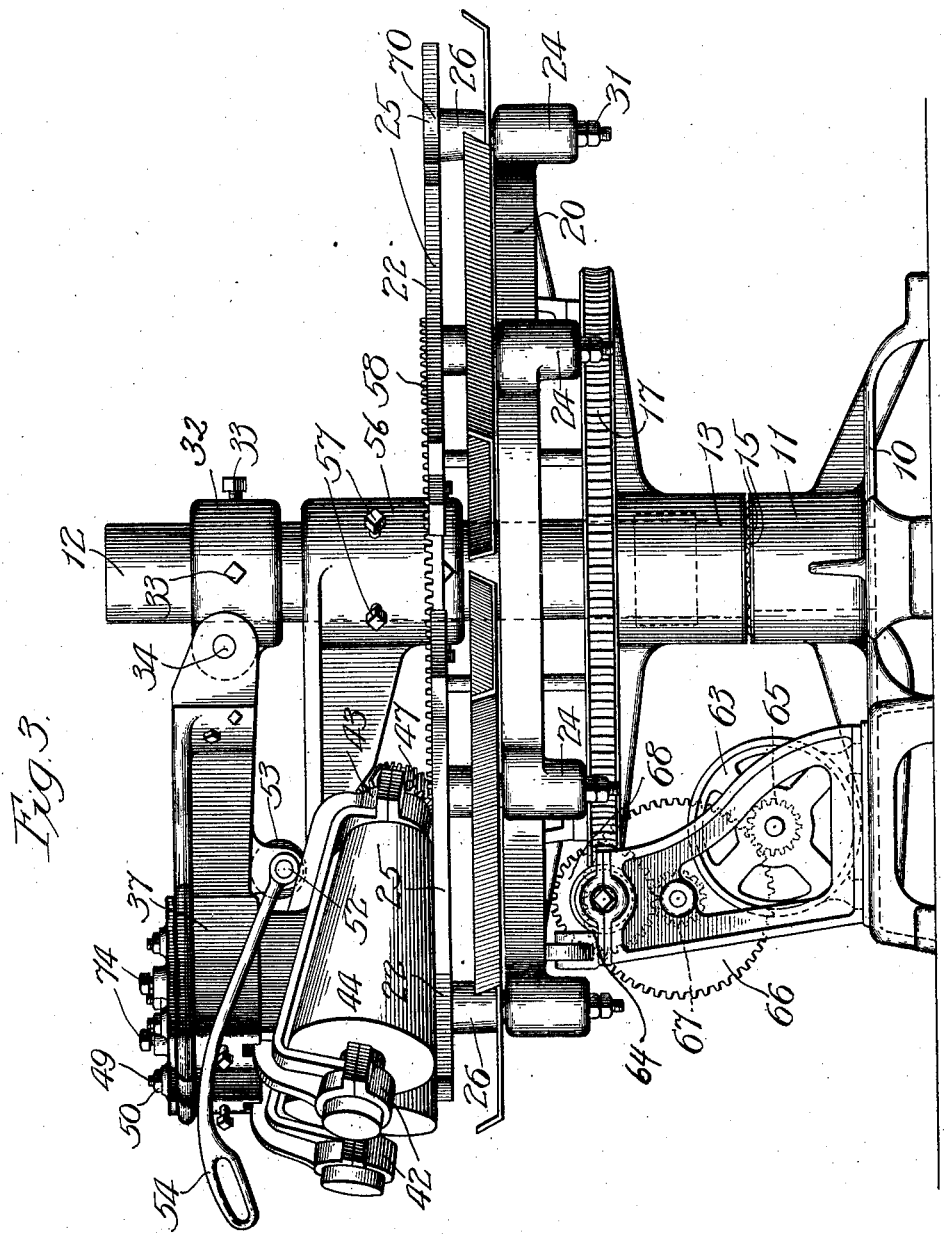
Figure 4:
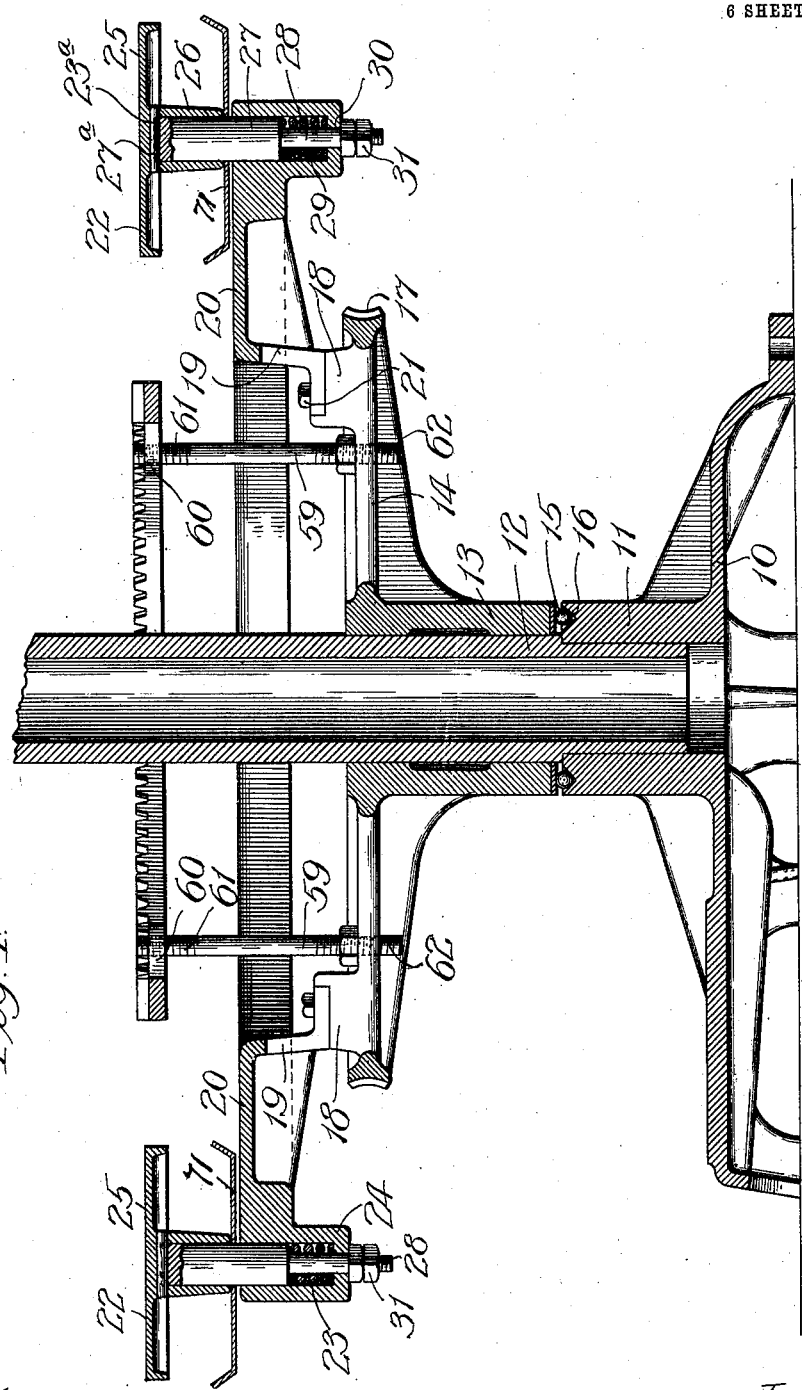
Figure 5:
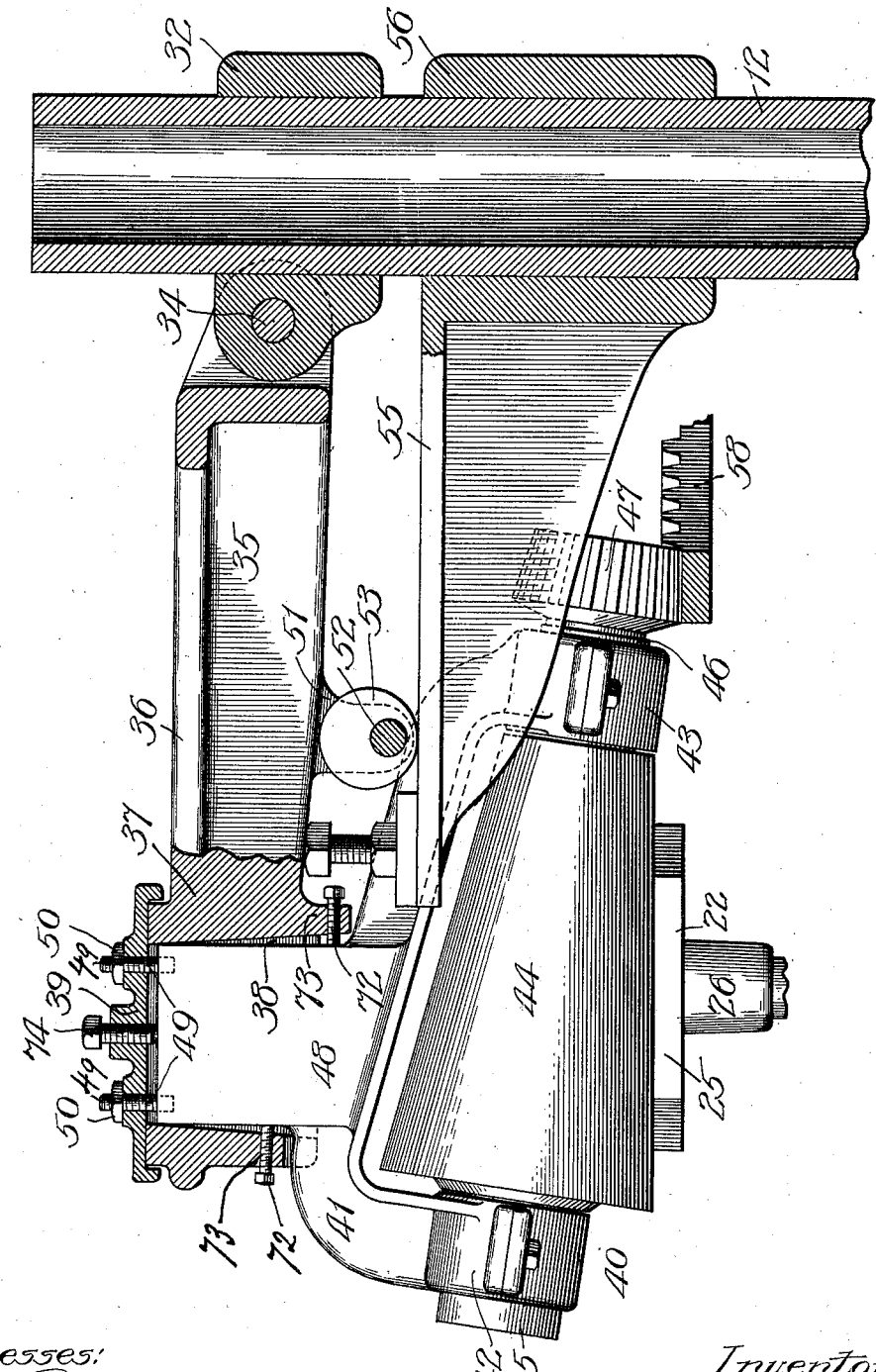

Referring to the accompanying drawings—Figure 1 is a plan view of a shirt-ironing machine constructed in accordance with my invention. Fig. 2 is a view in rear elevation of the machine represented in Fig. 1. Fig. 3 is a view in side elevation of the same. Fig. 4 is a section taken at the line 4 on Fig. 1 and viewed in the direction of the arrow. Fig. 5 is an enlarged broken section taken at the line 5 on Fig. 1 and viewed in the direction of the arrow. Fig. 6 is a plan view of a portion of a shirt-ironing machine forming a modification of the construction illustrated in the accompanying drawings. Fig. 7 is a view in side elevation of the same; and Fig. 8, a view in end elevation thereof.

The base of the machine which is represented at 10 and by which the machine may be secured to the floor supporting it, is provided centrally with an upwardly projecting tubular extension 11, from which rises a hollow column 12 fixedly secured thereto. Surrounding this column, near its lower end, is the hub 13 of a wheel-shaped member 14, this hub resting at its bottom annular surface upon balls 15, which travel in an annular groove 16 provided in the upper surface of the extension 11. The spokes of the member 14 carry at their extremities a gear 17 presenting arc-shaped teeth as represented, adapted to mesh with driving mechanism hereinafter described for rotating the wheel 14 upon the base 10. The spokes of the wheel 14 are provided with upright extensions 18 by which bracket-shaped arms 19 depending from the support 20 in the form of an annulus are bolted as represented at 21, the support 20 being concentric with the wheel 14 and extending laterally a considerable distance beyond the gear 17. Mounted upon the member 20 at intervals about its circumferential margin is a series of ironing-boards 22, these boards, which extend horizontally, being preferably supported to yield under excessive pressure exerted against them during the operation of the ironing mechanism hereinafter described. The preferred construction of connection between each ironing-board and the support 20 is as follows: The support 20 is provided at its circumferential margin with upwardly opening cylindrical sockets 23 which are located at intervals in the member 20 at the points where it is desired that the ironing-boards shall be located, these sockets extending downwardly into depending extensions 24 on the support 20. Each of the ironing-boards comprises a board proper 25 upon which the shirt to be laundried is applied, a socket-member 26 depending centrally from the board 25, a cylindrical plunger-bar 27 fixed in the socket 26, and a reduced section 28. The ironing-boards fit at their plunger-bars 27 in the sockets 23 and rest upon coil-springs 29 confined in the sockets and surrounding the reduced portions 28 of the bars, the latter extending through openings 30 in the bottom walls of the sockets 23 and carrying nuts 31 through the medium of which the tension of the springs 29 may be regulated as desired. As a means for preventing the boards 25 from turning upon their supports while in use, I form transverse grooves 23$^a$ in the upper surfaces of the plungers 27 into which cross-pins 27$^a$ in the socket-members 26, extend.

Surrounding the column 12 above the wheel 14, is a sleeve 32 secured thereto through the medium of set-screws 33 for effecting any desired vertical adjustment of this sleeve upon the column. Extending laterally from this sleeve and pivoted thereto as indicated at 34, is a rocking bracket 35 of yoke-shape affording arms 36 terminating in heads 37 converging with relation to each other as represented. Secured to the bracket 35 at its opposite sides, are two arms 35$^a$, each of which terminates in a head 37, the arms 35$^a$ being disposed radially of the column 12. Each of the heads 37 contains a vertically disposed opening 38, the walls of which converge upwardly as illustrated in Fig. 5, each of said heads being provided with a cap-plate 39.

Coöperating with the ironing-boards 25, which, it will be understood from the foregoing, are intended to travel in a circular path, are ironing-devices 40, each comprising a yoke 41 provided with bearings 42 and 43 extending radially of the column 12 and inclined at an angle to the horizontal plane, a frusto-conically shaped roller 44 provided toward its opposite ends with stub-shafts 45 and 46 at which it is journaled in the bearings 42 and 43, a bevel-gear 47 carried by the stub-shaft 46, and an upwardly extending lug 48 carrying studs 49 screw-threaded toward their upper ends. The lugs 48 of the ironing-devices 40 extend into the openings 38 in the heads 37, the studs 49 projecting upwardly through the cap-plates 39 and carrying nuts 50 on their upper ends for permitting vertical adjustment of the ironing-devices 40 upon the bracket 35 and arms 35ª. The bracket 35 carries depending lugs 51 toward its opposite sides in which is journaled a shaft 52 carrying an eccentric 53 disposed between these lugs, the shaft 52 being provided with a lever 54 beyond the ironing-mechanism 40 for turning the eccentric 53. The eccentric 53 rests upon an arm 55 extending radially from a sleeve 56 surrounding the column 12 below the sleeve 32 and confined on the column through the medium of set-screws 57, it being understood from the foregoing that the eccentric 53 rests at all times upon the support provided by the arm 55, and thus rotating the eccentric 53 through the medium of the handle 54 will cause the bracket 35 and arms 35ª to be raised or lowered, depending upon the direction in which the eccentric 53 is operated, thus effecting corresponding movement of the ironing-mechanisms 40.

In the construction illustrated, it is designed that the rollers 44 be positively rotated through the medium of the gear 58 meshing therewith supported on the wheel 14 through the medium of vertically disposed rods 59 screwing at their opposite ends into the wheel 14 and into spaced lugs 60 extending inwardly from the gear 58. The rods 59 are preferably provided toward their opposite ends with right and left hand screw-threads 61 and 62, whereby the gear 58 may be adjusted vertically as desired by turning the rods 59.

The wheel 14 carrying the ironing-boards 22 may be rotated by any suitable mechanism, that illustrated in the drawings being of the electrically driven type comprising a motor 63 secured to the base 10 of the machine, and serving to drive a worm 64 meshing with the worm-gear 17 through the medium of a train of gears comprising the gears 65, 66, 67 and 68.

The operation of the machine is as follows: The operator, or operators, as the case may be, applies the shirts to be ironed to the bosom-boards 25, which latter contain the usual neck-band-receiving recesses 70 at one end, and in practice would be provided with clamps (not shown) for holding the shirts to the boards, the shirts being thus applied while the boards are traveling in a circular path under the action of the rotating wheel 14 driven as hereinbefore described. As the shirts pass under the ironing-rollers 44, which may be heated in any desirable manner as is well understood in the art, the driving gears therefor being so proportioned as to cause the ironing surface of the rollers to move at the same speed as the bosom-boards, the bosoms of the shirts are smoothly ironed, and after passing the last ironing-roller the shirts may be removed from the board 25 in laundried condition by the operator. By forming the rollers 44 of frusto-conical shape, the movement of the ironing surfaces of these rollers corresponds to the movement of the opposed portions of the ironing-boards, and thus the effect upon the shirt-bosom is the same as that which would be produced if the ironing-board traveled in a straight path and the ironing-roller were of true cylindrical form, whereby there is no tendency to a twisting action of the rollers upon the shirt-bosoms being ironed.

To prevent the sleeves and body of the shirt from becoming soiled by contact with the gears of the machine, I provide trays 71 secured to the depending portions 26 of the board-devices 22 to extend below the bosom-boards 25 and beyond it at all sides, thus permitting the body-portion and sleeves of the shirt to be tucked under the boards 25 and rest upon the trays 71.

When the machine is not in operation, it is intended that the ironing-rollers 44 be out of contact with the padding (not shown) usually provided on the upper surfaces of the ironing portions 25, the removal of the rollers from the padding being effected by turning the eccentric 53 about one-half of a revolution through the medium of the lever 54, thus swinging the bracket 35 carrying the ironing-rollers upon its pivot 34 to raised position.

Adjustment of the rollers 44 with relation to the boards 25 may be effected through the medium of the studs and nuts 49 and 50 and set-screws 72 working through depending flanges 73 on the heads 37 and against sides of the lugs 48. To aid the set-screws 49, 50 and 72 in holding the rollers in adjusted position, I provide set-screws 74 in the cap-plates which bear downwardly against the top of the lugs 48. The tapering walls of the openings 38 permit of swinging adjustment of the roller-devices 40 and thus serve with the vertical adjustment devices to permit any desired adjustment of the ironing-rollers 40 to be effected.

Under certain conditions it is desirable that the shirts to be laundried be subjected not only to ironing rollers, but also to ironing-shoes for producing the desired finished appearance in the article. The construction illustrated in Figs. 6 to 8 inclusive, which is, in a sense, a modification of the construction represented in the preceding figures, is adapted to iron and produce a gloss on the shirt-bosoms and differs from the one first described, in the omission of the arms 35ª, when it is desirable to employ but two ironing rollers and the substitution of ironing-shoes 75 of well-known construction which are located on opposite sides of the group of rollers. These shoes which are hollow and may be heated, as by steam introduced into their interior in any suitable manner well known in the art are, in the construction illustrated, supported on the adjacent bearing-frames 35 from laterally-extending brackets 76, each provided with a centrally-disposed bearing 77 for a horizontally-disposed rock-shaft 78 carrying an eccentric 79 operative through the medium of a lever 80. Each bracket contains vertically-extending sockets 81 through which vertical lugs 82 on the upper side of the respective shoes extend, these lugs being threaded at their upper ends and carrying nuts 83 between which and the top of the bracket spiral springs 84 encircling the studs are confined, these springs holding the shoes under tension against the face of the eccentrics 79. From the foregoing description it will be understood that the shoes may be raised or lowered independently of the rollers 44 by operating their respective levers 80, and thus the work be subjected to the ironing-rollers alone or to the rollers and shoes as conditions require.

While the shoes are illustrated as associated with two ironing rollers, it will be manifest that the number of rollers may be varied as conditions require.

What I claim as new and desire to secure by Letters Patent is—

1. An ironing machine comprising, in combination, a support journaled to rotate in a horizontal plane, ironing boards carried by the support, an ironing roller supported to extend into the path of movement of the boards and coöperate therewith, a gear movable with said support, and a pinion connected with said ironing roller and meshing with said gear, for the purpose set forth.

2. An ironing-machine comprising, in combination, a support journaled to rotate in a horizontal plane, ironing-boards carried by the support, a group of radially-extending ironing-rollers supported to extend into the path of movement of the boards and coöperate therewith, a gear movable with said support, and pinions connected with said ironing-rollers and meshing with said gear.

3. An ironing machine comprising, in combination, a support journaled to rotate in a horizontal plane, ironing boards carried by the support, spaced alining bearings on the machine inclining with relation to the surfaces of said boards, a tapering ironing roller journaled in said bearings to extend into the path of movement of the boards, a gear movable with said support, and a pinion carried by said roller and meshing with said gear, for the purpose set forth.

4. An ironing machine comprising, in combination, a base, a standard rising from the base, a support journaled on the base to rotate in a horizontal plane, ironing boards carried by the support, a sleeve on the standard, an arm pivoted to said sleeve, an ironing roller carried by said arm and extending into the path of movement of said boards and coöperating therewith, a second arm supported on the column, and an eccentric journaled on said first-named arm and bearing against said second-named arm, for the purpose set forth.

5. An ironing machine comprising, in combination, a support journaled to rotate in a horizontal plane and containing upwardly opening sockets disposed circumferentially with relation to its axis, with restricted openings in the bottom walls of the sockets, ironing boards provided with depending plungers carrying rod-extensions, the plungers fitting in said sockets and the rod-extensions protruding through the openings in the bottom walls of the sockets, coiled springs in said sockets upon which the plungers bear, and means for regulating the tension of said springs, for the purpose set forth.

6. An ironing-machine comprising, in combination, a support journaled to rotate in a horizontal plane, ironing-boards carried by the support, a gear adjustably supported on said support, and an ironing roller supported to extend into the path of movement of the boards and coöperate therewith and provided with a pinion meshing with said gear, for the purpose set forth.

7. An ironing machine comprising, in combination, a support journaled to rotate in a horizontal plane, ironing boards carried by the support, a circular series of oppositely screw-threaded rods screwed into said support to extend vertically, a gear supported on the upper screw-threaded ends of said rods, and an ironing roller supported to extend into the path of movement of the boards and coöperate therewith and provided with a pinion meshing with said gear, for the purpose set forth.

8. An ironing machine comprising, in combination, a base, a standard rising from the base, a support journaled on the base to rotate in a horizontal plane, ironing boards carried by the support, an arm supported on said standard and having its outer end recessed and provided with a cap-plate, a yoke-shaped bearing frame provided with an upward extension loosely fitting into said recess, screw-threaded studs carried by said extension and projecting through said cap-plate and carrying nuts, a set-screw in said arm bearing against said extension, and an ironing roller journaled in said yoke-frame to extend into the path of movement of the boards and coöperate therewith, for the purpose set forth.

9. An ironing machine comprising, in combination, a base, a standard rising from the base, a support journaled on the base to rotate in a horizontal plane, a gear carried by said support, ironing boards carried by said support, a plurality of arms carried by said standard, bearing frames each having alined bearings inclined with relation to the upper surfaces of the boards, supported on the outer ends of said arms to extend radially of the axis upon which the support rotates, and tapering ironing rollers journaled in the bearings in said frames to extend into the path of movement of the boards and coöperate therewith and carrying pinions meshing with said gear, for the purpose set forth.

10. An ironing machine comprising, in combination, a base, a column rising therefrom, a support in the form of a wheel surrounding the column and journaled on the base, a gear carried by the support to rotate therewith, ironing boards carried by the support and disposed circumferentially of the axis of the latter, a circular rack carried by said support, driving means operatively connected with said gear for rotating said support, a sleeve supported on said column, a bracket-device pivoted to said sleeve, alined pairs of bearings inclined with relation to the upper surface of the boards and arranged radially of the axis upon which the support rotates, tapering ironing rollers journaled in said bearings to extend into the path of movement of the boards and coöperate therewith, and pinions carried by said rollers and meshing with said rack, for the purpose set forth.

CHARLES T. GILMORE.

In presence of—
W. B. DAVIES,
R. A. SCHAEFER.